J. B. ATWOOD.
RAILWAY CAR CONTROL APPARATUS.
APPLICATION FILED DEC. 9, 1907.
952,494.
Patented Mar. 22, 1910.
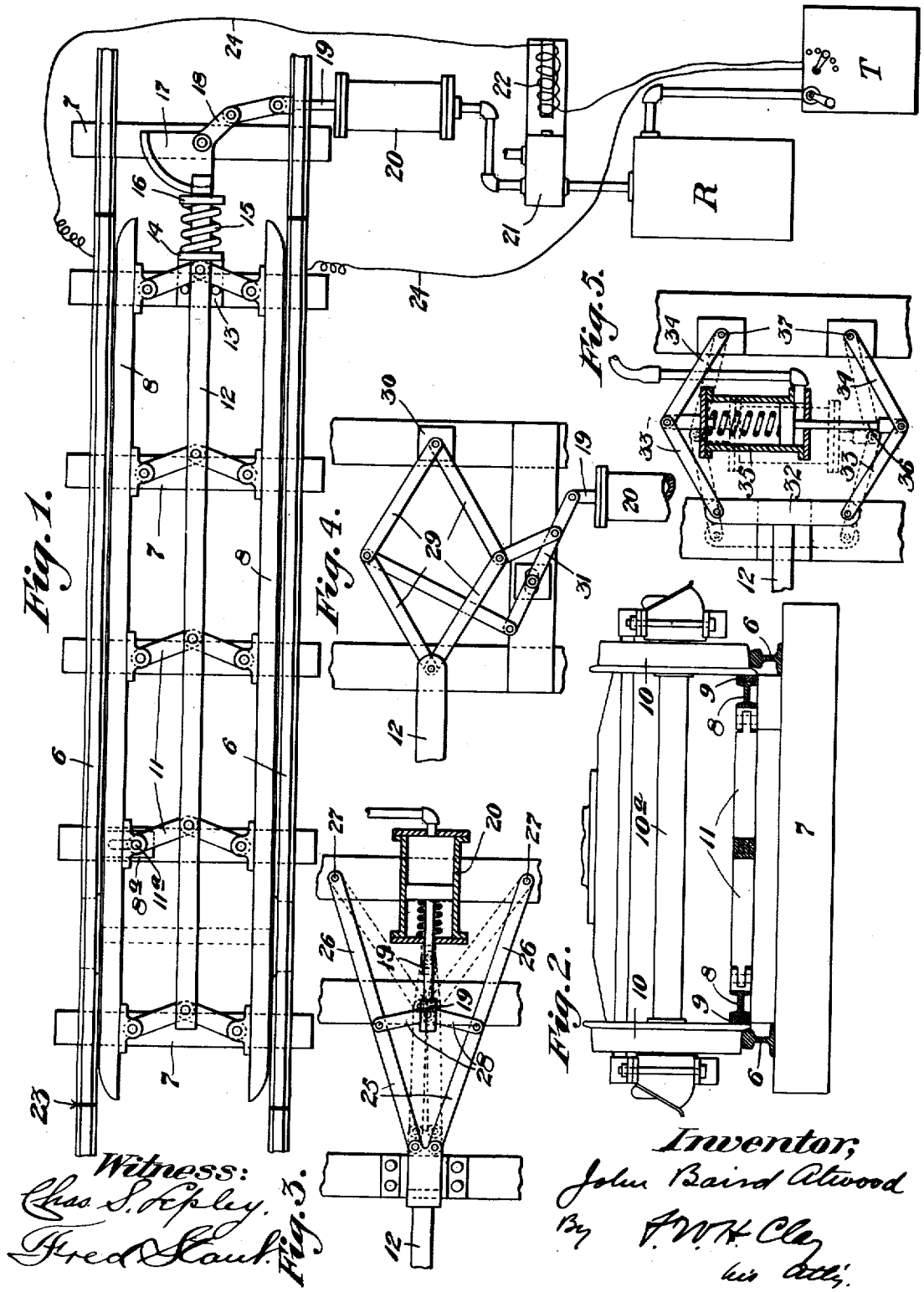

UNITED STATES PATENT OFFICE.

JOHN BAIRD ATWOOD, OF ALLEGHENY, PENNSYLVANIA.

RAILWAY-CAR CONTROL APPARATUS.

952,494.  Specification of Letters Patent.  Patented Mar. 22, 1910.

Application filed December 9, 1907. Serial No. 405,668.

*To all whom it may concern:*

Be it known that I, JOHN BAIRD ATWOOD, a citizen of the United States, residing at Allegheny, in the State of Pennsylvania, have invented a certain new and useful Improvement in Railway-Car Control Apparatus, of which the following is a specification.

My invention relates to means acting from outside of the car for retarding or stopping cars on tracks, and especially to stationary track brakes for use in switch yards.

This invention is a further improvement on the devices of prior application No. 330,917, filed Aug. 16th, 1906; and its primary objects are, to provide a track brake more efficient in action and easier upon the car wheels, and a brake which operates automatically by means of electrical or other self-operated devices.

Further objects are to improve the construction of the brake itself and of the operating means therefor, in order to more efficiently use the power and handle the brake with more certainty.

In the accompanying drawing Figure 1 is a plan view of a portion of track and of the brake in one form, and showing in diagram the location of certain other parts. Fig. 2 is a vertical section through the track and brake under a car wheel, and showing the position of a car wheel thereon. Figs. 3, 4, and 5 are detached views of modified forms of brake operating means.

It will be understood that the invention is especially useful on the switches of railway yards, where it is desired to retard or stop cars at various points and to release them to continue down the grade on the switch at will. It is especially desirable that such brakes be operated from a distance and require no attendants, either on the car or in the yard.

In the accompanying drawing, referring to Figs. 1 and 2, I provide within the track rails 6, preferably resting upon the ties 7, a pair of brake bars 8 which have flared ends and are conveniently made in the form shown in Fig. 2, having preferably soft iron renewable wearing-faces 9 to engage the wheel of a car. It is to be especially noted that the brake bar 8 engages the wheel 10 somewhat above the line of the top of the rail, so that it comes in contact not with the "dead point" of the wheel as it moves, but with the two parts of the periphery widely separated and in rapid motion; this is to increase the effectiveness of the brake. The brake bars 8 may be operated by means of toggle links 11, which are pivoted in any convenient way to the brake bar, and preferably inclined against the direction of the car's motion, and at their meeting ends they are pivoted preferably with a knuckle joint to the main thrust bar 12. The links 11 may be of any number desired and the bar 12 and brake bars 8 are preferably long enough to engage all the wheels of a car at once. While the bar is here shown as a thrust bar, the operating means may obviously be placed at the front end and operate by pulling the bar 12. At one end of the thrust bar 12 it may rest upon a plate 13 having an upturned flange 14, through which the bar extends and against which any convenient form of spring 15, may rest and by engaging the collar 16 on the outer end of the bar 12 will normally keep the bar 12 thrust back in position to withdraw the brake bars from engaging position. When an ordinary air-brake cylinder 20 is used, however, this is not needed. It will be understood that the bar 8 may be provided with any convenient means for support and guidance, such as a plate 8ᵃ on the tie provided with a slot engaging the pin 11ᵃ of the link 11.

For operating the bar 12 I may employ various devices, and for simplicity Fig. 1 shows a cam plate 17 pivoted on one of the cross-ties 7 and having an arm 18 which is linked to the piston rod 19 of an air cylinder 20. Compressed air may be provided from any source such as an auxiliary reservoir R or from the operating tower indicated at T. The air is controlled by any convenient form of valve 21, which may be operated by an electrical device such as a solenoid 22. In order to make the operation automatic, I prefer to provide insulation 23 for the two rails 6 and make electrical connections 24 so that the solenoid is automatically operated by the car wheels 10 and axle 10ᵃ or the brake making circuit across the rails 6, as will appear from Fig. 2. This will cause the valve 21 to open admitting air to turn the cam 17 and thrust the brake against the wheels as soon as the first wheel enters the brake.

More efficient means for operating the thrust bar by the brake cylinder, are shown in Figs. 3, 4, and 5. In Fig. 3 the end of the thrust bar 12 is provided with two pair of toggle links 25 and 26. These are fixed at 27 to one of the cross-ties, which also may support the brake cylinder 20. The piston rod 19 is provided with a pair of toggle links 28, which are pivoted to the meeting ends of links 25, 26. It will thus be evident that in the position shown in Fig. 3 these latter links will be pushed out into alined position thrusting the bar 12 forward and in this position all strains are practically relieved from the brake cylinder, and also as the brakes approach the position of greatest pressure, the power of the levers increases to a high maximum. When the piston rod 19 is withdrawn, the toggle joints are broken and take the position shown in dotted lines. With this form of device there are no parts needing lubrication and no parts that can get out of order, and the operation is trustworthy and exact, meeting the conditions of use exactly by providing the heavy pressure at the exact time when it is needed, and making easy release not depending upon springs.

In Fig. 4 I have shown a series of toggle levers 29 their ends being fixed at 30 and which may be operated by levers 31 by means of the links shown and provide very much multiplied power when moved by the piston rod 19.

In the device of Fig. 5, the thrust rod 12 is provided with an extended cross bar 32 to which are pivoted the toggle links 33, 34 and these links at their meeting point are mounted directly on the one side upon the cylinder 35 and on the other to its piston rod 36. The links being fixedly pivoted at 37, and the cylinder hanging free or slidingly supported, it will be evident that when air is admitted to the front of the cylinder its piston rod will be drawn inwardly and thus draw in the links and thrust the bar 12 forward, and that when the motion is completed the links will stand in alined position, so that there is a direct thrust against the anchorage points and no strain upon the cylinder. When the air is let off, the cylinder will return to normal position.

The above description will make the operation evident and it is noted that by this means a series of these brakes being placed on the switches of a railway yard, as described in my prior application, any car may be stopped or retarded at any one of these points desired, and may be released at will, all operating from the central tower. The operator may instantly and accurately control the movements of the car by varying the power of the solenoid, or by varying the air pressure as is customary in the case of air-brakes. But any brake may be set to work automatically without any attention and may be retained in closed position as long as desired. Other advantages will readily occur to those familiar with the art.

Having thus described my invention and illustrated its use, what I claim as new and desire to secure by Letters Patent, is the following:—

1. The combination with a track brake of automatic means controlled by the car wheel to close the brake upon the wheels when the wheels enter the brake.

2. The combination of a track brake and a compressed air cylinder to operate it, and means operated by the car wheel, to cause the air cylinder to throw on the brake.

3. The combination of a pair of track brake bars, an operating bar having connections to move the brake bars, a compressed air cylinder adapted to actuate the operating bar, and electric devices for controlling the cylinder from a distance.

4. A track brake and electric means for controlling it, and connections by which the car itself makes the electric circuit.

5. A track brake having an operating bar and links an operating motor and connections between the motor and operating bar by which the effective power of the action increases as the brake closes.

6. The combination with a track brake and an operating rod therefor, of an air cylinder connected to said rod by links which take all the thrust when the brake is closed.

7. The combination with a track brake and an operating rod therefor, of an air cylinder connected to said rod by links, said links being adapted to increase their leverage against the rod as the brake approaches closed position.

In testimony whereof, I have hereunder signed my name in the presence of the two subscribed witnesses.

JOHN BAIRD ATWOOD.

Witnesses:
F. W. H. CLAY,
FRED STAUB.